United States Patent [19]

Brierley et al.

[11] Patent Number: 4,859,017

[45] Date of Patent: Aug. 22, 1989

[54] DIELECTRIC OPTICAL FABRY-PEROT WAVEGUIDE DEVICE AND METHOD FOR MAKING AND USING SAME

[75] Inventors: Michael C. Brierley; Stephen R. Mallinson, both of Ipswich; Colin A. Millar, Felixstowe; William P. Urquhart, Ipswich, all of England

[73] Assignee: British Telecommunications plc, London, England

[21] Appl. No.: 26,444

[22] PCT Filed: Jul. 21, 1986

[86] PCT No.: PCT/GB86/00430

§ 371 Date: Mar. 19, 1987

§ 102(e) Date: Mar. 19, 1987

[87] PCT Pub. No.: WO87/00699

PCT Pub. Date: Jan. 29, 1987

[30] Foreign Application Priority Data

Jul. 24, 1985 [GB] United Kingdom ............... 8518739
Sep. 24, 1985 [GB] United Kingdom ............... 8523532
Dec. 20, 1985 [GB] United Kingdom ............... 8531422

[51] Int. Cl.$^4$ .......................... G02B 6/26; G01B 9/02; H04B 9/00

[52] U.S. Cl. ............... 350/96.15; 350/96.16; 350/96.10; 350/96.29; 350/320; 356/345; 356/352; 370/3

[58] Field of Search ............ 350/96.10, 96.12, 96.13, 350/96.14, 96.15, 96.16, 96.29, 96.30, 320; 356/345, 352; 250/227; 372/6, 92, 98, 99; 370/1, 3

[56] References Cited

U.S. PATENT DOCUMENTS

| | | | |
|---|---|---|---|
| 4,466,694 | 8/1984 | MacDonald | 350/96.19 |
| 4,515,431 | 5/1985 | Shaw et al. | 350/96.15 |
| 4,530,603 | 7/1985 | Shaw et al. | 356/345 |
| 4,536,088 | 8/1985 | Rashleigh et al. | 356/351 |
| 4,592,043 | 5/1986 | Williams | 370/3 |
| 4,627,728 | 12/1986 | Willson | 356/345 |
| 4,639,922 | 1/1987 | Miller | 372/19 |
| 4,676,583 | 6/1987 | Hicks, Jr. | 350/96.15 |
| 4,720,160 | 1/1988 | Hicks, Jr. | 350/96.15 |
| 4,768,849 | 9/1988 | Hicks, Jr. | 350/96.15 |
| 4,794,617 | 12/1988 | Boeck | 350/96.15 |
| 4,799,749 | 1/1989 | Börner et al. | 350/96.15 |

FOREIGN PATENT DOCUMENTS

| | | | |
|---|---|---|---|
| 0103382 | 3/1984 | European Pat. Off. | 350/96.15 X |
| 0104942 | 4/1984 | European Pat. Off. | 372/6 X |
| 0136871 | 4/1985 | European Pat. Off. | 372/6 X |
| 0143645 | 5/1985 | European Pat. Off. | 350/96.15 X |
| 0146262 | 6/1985 | European Pat. Off. | 372/6 X |
| 58-55911 | 4/1983 | Japan | 356/352 |
| 58-169037 | 10/1983 | Japan | 356/352 |
| WO85/02469 | 6/1985 | PCT Int'l Appl. | 350/96.15 X |
| 2136956 | 9/1984 | United Kingdom | 350/96.15 X |

OTHER PUBLICATIONS

Optics Letter 5 vol. 7, No. 6, Jun. 1982 Stokes et al.

*Primary Examiner*—William L. Sikes
*Assistant Examiner*—Brian M. Healy
*Attorney, Agent, or Firm*—Nixon & Vanderhye

[57] ABSTRACT

A selective filtering device for use in optical communications systems takes the form of a transversely coupled Fabry-Perot interferometer. One described embodiment comprises a first length of monomode optical fiber transversely coupled to a second fiber in a coupling region. One end of each fiber at opposite respective ends of the coupling region is provided with a suitable highly reflective surface, or example, an evaporated gold/aluminum deposit. In operation, a light input may be modified by the resonant cavity behavior of the Fabry-Perot cavity formed between the mirrored ends to provide filtered or enhanced outputs. The outputs may be further modified by alternative or additional light input via the ends of the fibers.

13 Claims, 6 Drawing Sheets

DIELECTRIC OPTICAL FABRY-PEROT WAVEGUIDE DEVICE AND METHOD FOR MAKING AND USING SAME

FIELD OF THE INVENTION

The present invention relates to optical resonant cavities, and in particular to cavities using dielectric optical waveguides.

BACKGROUND AND SUMMARY OF THE INVENTION

In optical systems, in-line devices such as diffraction gratings and prisms have heretofore been used as transmission or reflection wavelength filters. Alternatively, devices using the interferometric principles of cavity resonators, such as, for example, the Fabry-Perot etalon have been proposed as wavelength filters or selective amplifiers. An example of such an interferometric filter is disclosed in published European Patent Application EP 143645, in which the ends of two optical fibres are mirrored and longitudinally aligned in close proximity in a suitable housing. The arrangment provides an etalon which forms a wavelength filter that can be adjusted by varying the separation of the fibre ends. Problems which can arise with 'in-line' resonators of this kind are the losses which are introduced, for example, owing to electromagnetic mode mismatch, spurious reflection and other factors, as a consequence of the break in the continuity of the transmission line.

An alternative approach to providing an optical filter comprises using a ring of optical fibre, as described, for example, by Stokes et al. in "All-single-mode fiber resonator", Optics Letters, Vol. 7, No. 6, June 1982. Stokes' device consists of a loop of optical fibre 3 m in circumference. For most purposes the spectral response of a ring of such length is excessively narrow, and a device of this size would clearly be impractical for most applications. However, reducing the size by using rings of smaller circumference, and thereby broadening the spectral response, has been found to introduce curvature dependent bending losses which increasingly degrade the overall performance as the radius of curvature of a ring is reduced.

It is an object of the present invention to provide an improved, selective optical cavity resonator which avoids, or at least mitigates, some of the aforementioned problems.

According to the present invention a dielectric optical waveguide device comprises a first waveguide transversely coupled to a second waveguide at a coupling region, wherein one end of each waveguide selected at opposite ends of said coupling region is provided with a reflection means, thereby to form a Fabry-Perot cavity.

Preferably, both the waveguides are optical fibres; most preferably, monomode optical fibres.

The waveguides may alternatively be fabricated on substrates, such as, for example, lithium niobate.

Conveniently, the reflection means comprise reflective surfaces provided by deposition directly on the waveguide ends.

The reflective surfaces may comprise metallic coatings, and may conveniently be provided by conventional techniques such as evaporated gold/aluminium deposition or by grown silver. Alternatively, the reflective surfaces may be dielectric reflection coatings.

In place of direct deposition, the reflection means may be provided by mirrors butt-mounted on the waveguide ends. As a further alternative, the reflection means may comprise other apparatus or combinations of apparatus known to the skilled worker and adapted to perform the function of optically reflecting incident light over the operating spectral range of the device.

When the device is employed as an optical filter, preferably the reflection means will be very highly reflective. Over the operating spectral range of the device the reflectivities will be preferably at least 0.8, and more preferably, at least 0.9.

Conveniently, the device is tunable, and further comprises means to effect the tuning. For example, tuning may be achieved by altering the effective length of the Fabry-Perot cavity. In one embodiment, the tuning means comprises a piezo-electric stretcher to adjust the length of one of the waveguides where that waveguide forms part of the Fabry-Perot cavity.

Either or both waveguides may incorporate a dopant, in addition or alternative to conventional refractive index modifying dopants, to alter the optical properties thereof. The dopant may comprise a light amplifying medium, such as, for example, neodymium. In these circumstances, lower reflectivity reflection means may be desirable.

BRIEF DESCRIPTION OF THE DRAWINGS

The invention will now be described in detail and by reference to the accompanying drawings in which.

Detailed Description

Figure 1:
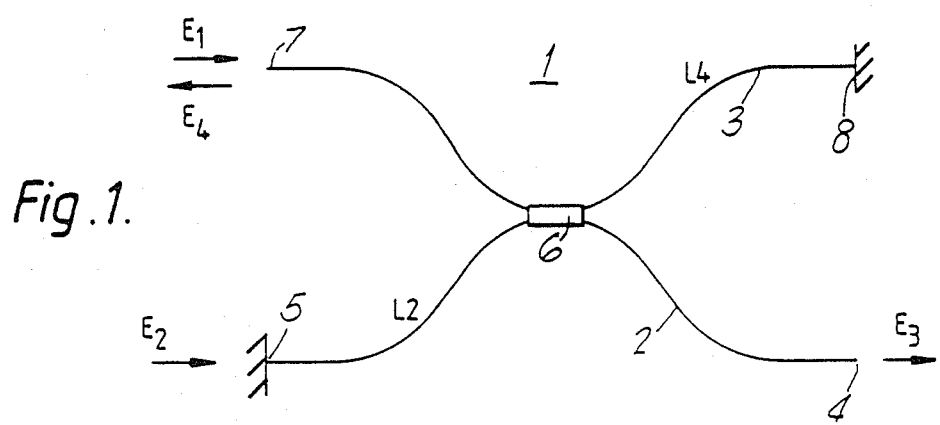
FIG. 1 is a schematic representation of an optical device according to the present invention.

Referring now to FIG. 1, a transverse coupled Fabry-Perot interferometer 1, which behaves as a wavelength selective filtering device, using monomode optical fibres as waveguides, comprises a first fibre 2 coupled to a second fibre 3 in a coupling region 6 in a directional coupler. In this example, the coupling region 6 is at or near the mid-point of fibre 2. One end 5,8 of each fibre 2,3 at opposite respective ends of the coupling region 6 is provided with a reflective surface. The two lengths of fibre L2, L4 between these ends 5,8 with reflective surfaces together form a resonant cavity. The fibres are shown curved in the diagram for convenience. In practice, the fibres will normally be mounted relatively straight in a suitable potting compound. The coupling at 6 may be achieved by fusing or other known methods.

In construction, the ends 5,8 of the fibres 2,3 which are to be provided with suitably reflective surfaces are first cleaved and/or polished to be perpendicular to the fibre axes (to better than 0.5°), flat and free from chipping and other defects. These ends are then mirrored.

The reflective surfaces may be provided by butt-mounting of prepared reflectors or by deposition of reflective material. Such mirroring may be achieved by forming a silver deposit on the ends as described in published UK Patent Application GB 2136956A. By this technique, it is possible to obtain mirrored surfaces which give greater than 95°/o reflectivity. Alternatively, the reflective surfaces may be provided by other metallic deposits such as, for example, evaporated gold/aluminium, using conventional techniques. As a further alternative, the reflective surfaces may comprise dielectric reflective coatings.

The first fibre 2 is attached to the second fibre 3 in the coupling region 6 using a suitable technique. The choice of technique will depend on such factors as, for example, the required ease of handling in assembly. Thus fused taper construction might be appropriate for longer lengths of fibre. Alternatively, the coupling may be provided by an adjustable polished coupler, or by other means, such as, for example, D-fibre coupling, well known to those skilled in the art.

The cavity provided by the present invention may be seen to have constructional advantages. For example, the fibres 2,3 may both be of easily manipulable lengths, thus making it a relatively simple matter to construct a Fabry-Perot cavity of any appropriate desired length. Further, the device 1, with its constructional symmetry, may be made by first providing reflective surfaces on one end 5,8 of each of the two fibres 2,3 before they are coupled. As there is one non-mirrored end 4,7 on each of the two lengths of fibre 2,3, which form the device 1, monitoring and evaluation of the reflective surfaces and/or of the quality of the coupling (by control of the coupling parameter, K, as discussed in more detail below) as desired may be conveniently straightforward.

The degree of transverse coupling of the evanescent fields in the optical fibres is conventionally indicated by a coupling parameter, K, which is a measure of the percentage power coupled from one fibre into another. The coupling parameter is wavelength dependent. For a given wavelength the coupling is a maximum when the effective length of the coupling region itself is equal to an odd number of half-wavelengths, and a minimum when the length is equal to an even number of half-wavelengths. The coupling parameter may be selected by appropriately adjusting the proximity of the fibre cores and the extent of the overlap defining the coupling region.

Figure 6:
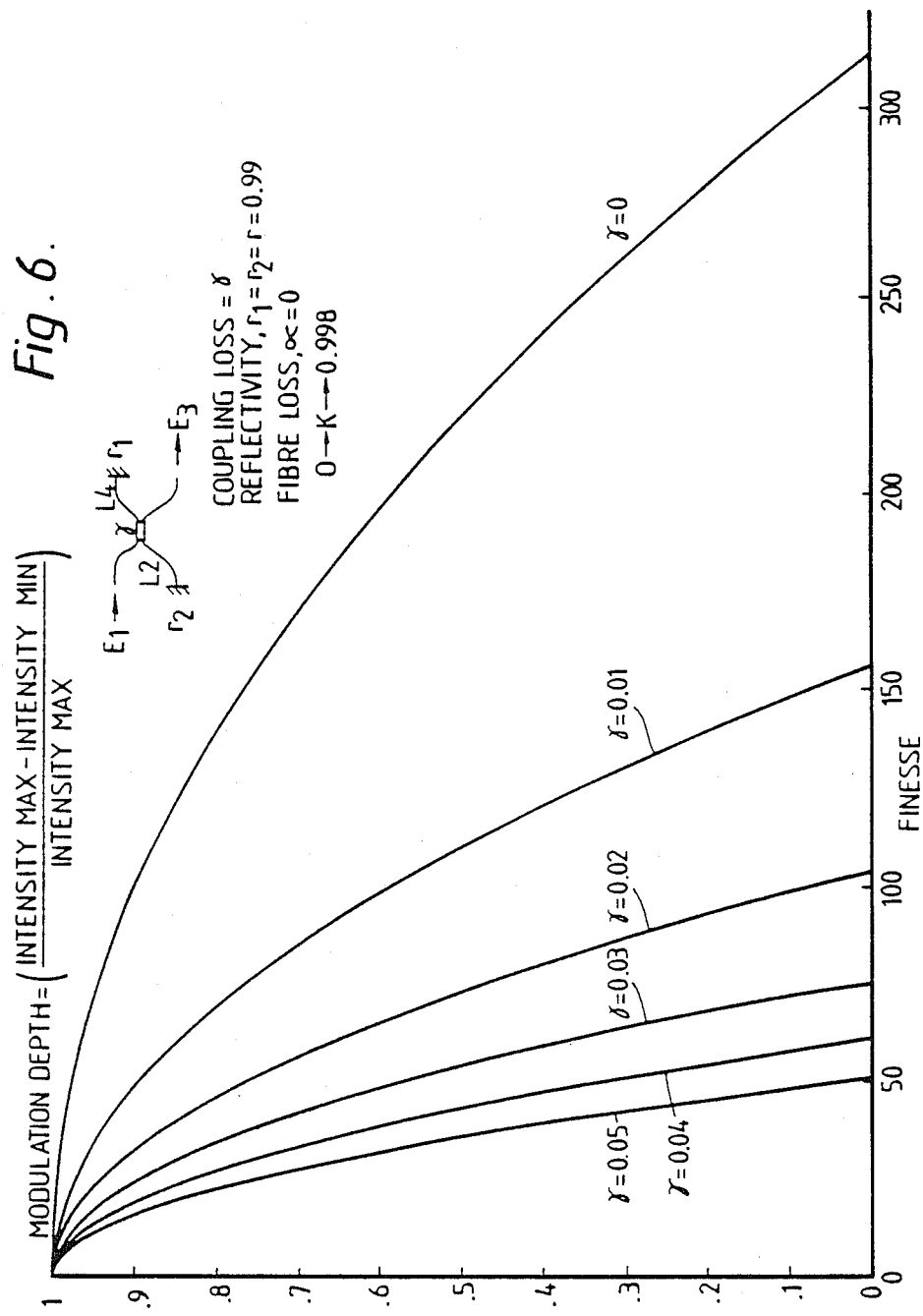
FIG. 6 is a calculated graph of the modulation depth versus finesse for a device of FIG. 1 for the indicated input and output configuration.

The finesse of a cavity resonator, which provides a measure of the frequency selectivity of the device, depends, among other factors, on the proportion of power coupled into the cavity itself. Generally, a higher finesse corresponds to a lower percentage coupling. In contrast, for the device 1 of the present invention, higher values of K will correspond to a higher finesse (see FIGS. 6 and 7 below). The finesse is also significantly affected by the reflectivities of the reflection means defining the cavity length. For high finesse the reflectivities should be as great as possible. Thus for use as a filter, reflectivities above 0.99 across the operating spectral range will be desirable and are achievable. Preferably, the reflectivities will be at least 0.8, and more preferably at least 0.9. If it is necessary to provide an input or output via the reflection means, for example, if the resonant cavity is doped with a light amplifying medium, then lower reflectivities may be required. The skilled person will thus make an appropriate choice of the reflectivities for the desired device function.

In operation of the device of FIG. 1, an optical input $E_1$ via the unmirrored end 7 of one fibre 3 produces a corresponding optical output $E_4$ back out via the same end and another output $E_3$ which exits via the unmirrored end 4 of the other fibre 2 as indicated in the Figure. An optical input $E_2$ (illustrated via the mirrored end 5 of the first fibre 2) may also be made directly into the resonant cavity via the mirrored end 5,8 of either fibre 2,3. The outputs will be modified according to such parameters as, for example, the reflectivity of the reflection means of the cavity, the length of the cavity (L2+L4), the position of the coupling region 6 (ie. the ratio L2:L4) and the magnitude of the coupling parameter, K. Although K is itself wavelength dependent, as determined by such factors as, for example, the nature of the coupling and the length of the coupling region, the variation is slow and, consequently, for most purposes K may be considered essentially constant over the free spectral range of the Fabry-Perot cavity.

Mathematically, for the device of FIG. 1, the outputs for a normalised input ($E_1 = 1$) are expressible as intensities in the following form:

$$E_3 \alpha (1 + A \sin^2[\beta(L2+L4)])/(1 - B \sin^2[\beta(L2+L4)])$$

$$E_4 \alpha (1/(1 - B \sin^2[\beta(L2+L4)]))$$

Where $\beta$ is the fibre propagation constant, and A and B are constants dependent on mirror reflectivities (r), coupling loss ($\gamma$), intrinsic fibre amplitude transmission loss ($\alpha$) and coupling ratios (ie. the relative position of coupling region, and the magnitude of the coupling parameter, K).

Figure 2:
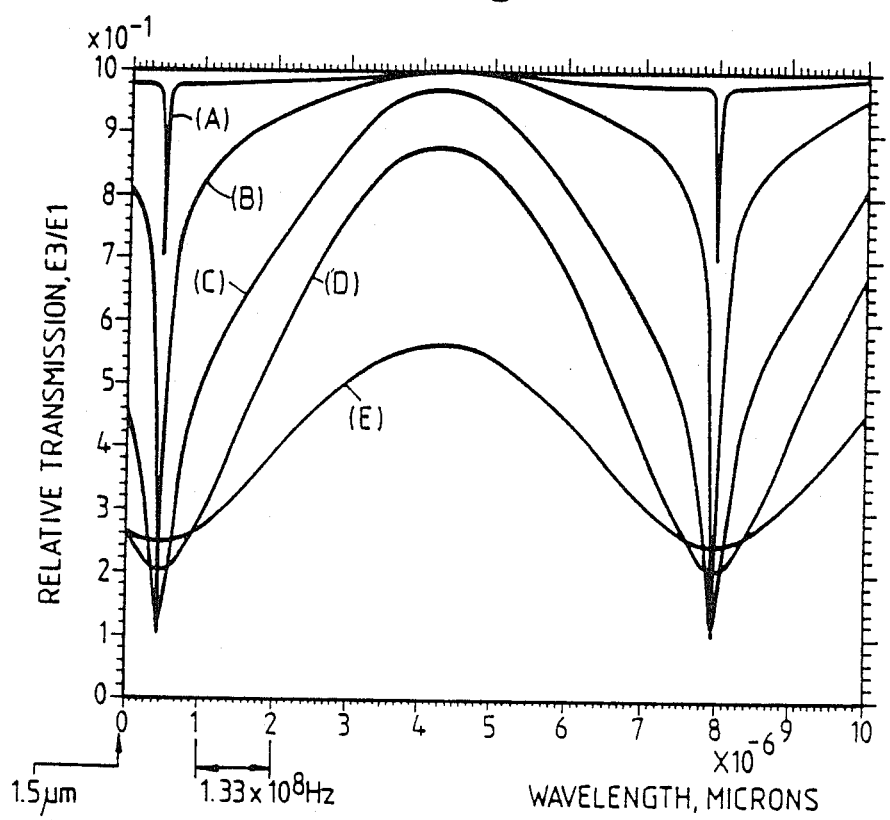
FIG. 2 is a calculated graph of the ratio of intensity in the output arm of the device of FIG. 1 to that in the input arm as a function of wavelength, for a cavity length of 10 cm.
Figure 3:
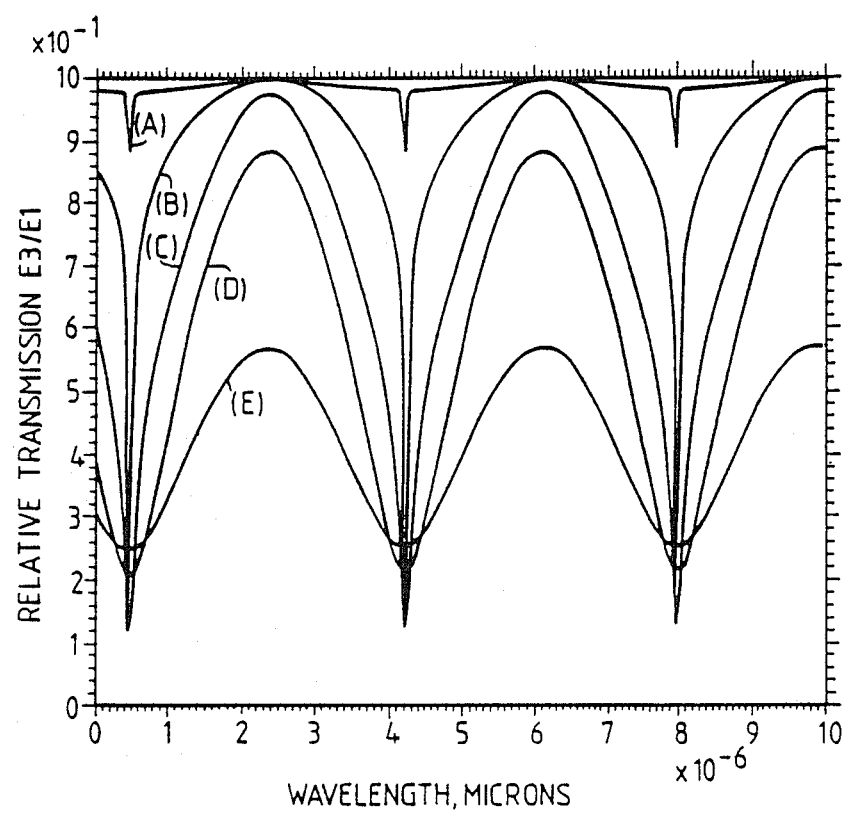
FIG. 3 is a graph similar to FIG. 2, for the device of FIG. 1 and for a cavity length of 20 cm.

It is important to note that the argument of the sinusoidal variation involves the sum of fibre lengths within the cavity. The frequency dependence of the variation in intensity, as illustrated in FIGS. 2 and 3, for example, is thus independent of the relative position of the coupling region with respect to the mirrors. In contrast, the amplitude terms involve other functions of the lengths L2 and L4, and are not purely dependent on the sum (L2+L4). Therefore, the amplitude related modulation depth is dependent on the position of the coupling position and the input-output configuration. In fact this dependence is weak and is itself dependent on the intrinsic fibre amplitude transmission loss ($\alpha$). As $\alpha$ tends to zero, so the position dependence of the modulation depth reduces to nil.

FIG. 2 illustrates a calculated spectral response for various values of K for a device according to FIG. 1 with ideal 100% mirror reflectivity and a resonant cavity length (L2+L4) of 10 cm. The graph shows the relative intensity of transmission as a ratio of output $E_3$ to input $E_1$ as a function of wavelength. Curves (A) to (E) relate to different values of coupling parameter K. Thus, FIG. 2 is a graph of relative intensity transmission showing the ratio of intensity in the output arm to that in the input arm as a function of wavelength, where the cavity length, L2+L4=10 CMS, and the coupling parameters K are: (A) 0.9, (B) 0.7, (C) 0.5, (D) 0.3, and (E) 0.1. It can be seen that in this case the device behaves as a filter reflecting back ($E_4$) at resonant wavelengths and passing the light at off-resonant wavelengths ($E_3$).

FIG. 3 shows a calculated spectral response also for a device according to FIG. 1 for a resonant cavity length of 20 cm, other parameters being as for FIG. 2. Thus, FIG. 3 is a graph of relative intensity transmission showing the ratio of intensity in the output arm as a function of wavelength, where the cavity length L2+L4=20 CMS, and the coupling parameters K are: (A) 0.9, (B) 0.7, (C) 0.5, (D) 0.3, and (E) 0.1.

As is evident from these calculated graphs, for a cavity (or in this case first fibre $2a$) of such lengths (10-20 cm) the passbandwidth is of the order of a few hundred megahertz. To increase the passbandwidth to the gigahertz range the cavity length will have to be reduced to the order of millimetres.

Figure 4:
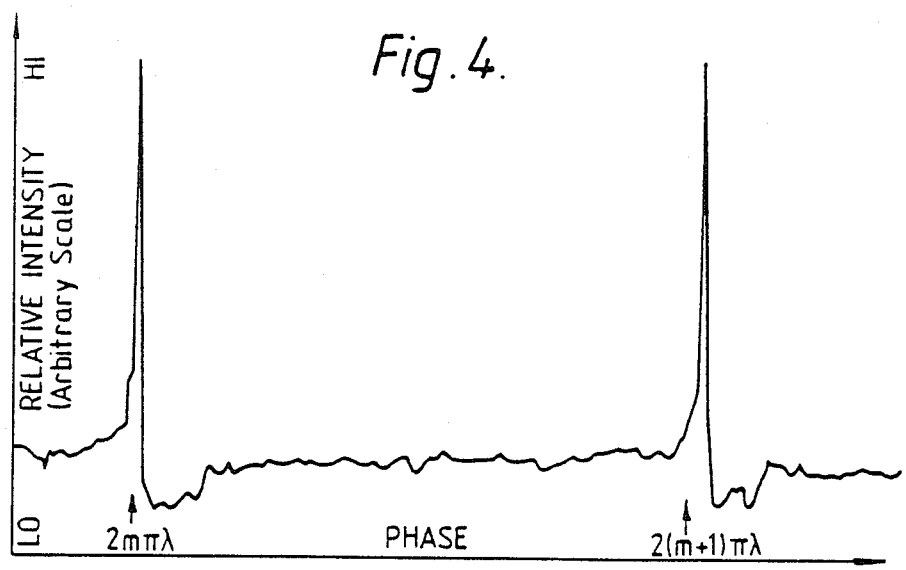
FIGS. 4 and 5 are graphs illustrating the performance of one practical device.
Figure 5:
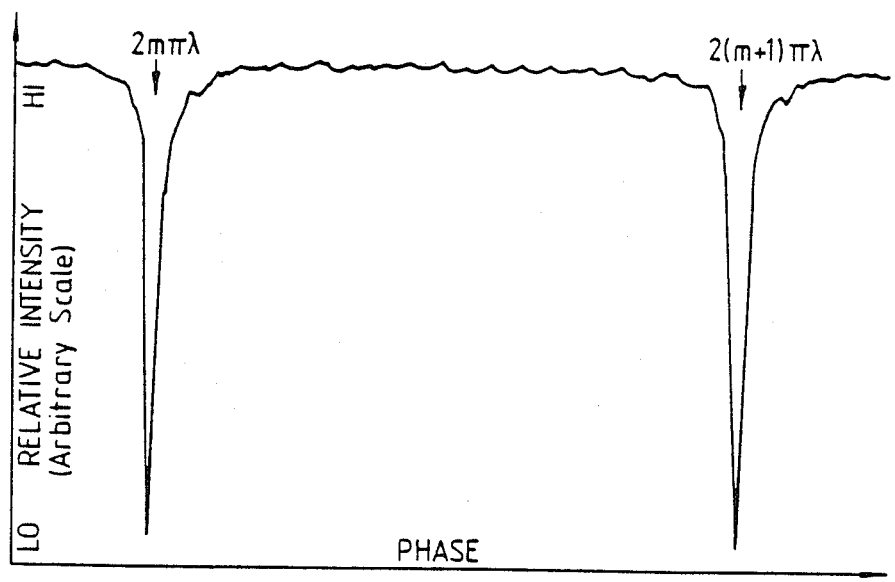

FIGS. 4 and 5 are reproductions of oscilloscope traces illustrate the experimental results achieved for a single input ($E_1$) into a device according to FIG. 1. To form the device, a fixed coupler with an intensity coupling co-efficient of 99.2% at the source wavelength and a coupling loss of between 0.02 dB and 0.04 dB was used. The reflection means (5,8 of FIG. 1) were provided by butt-coupled adjustable dielectric mirrors with better than 99% reflectivity. The effective resonant cavity length (L2+L4) was approximately 2.3 m. In this experiment a HeNe laser 1.523$\mu$m source was employed. The input was therefore at a fixed wavelength and consequently the resonant selectivity of the device itself was demonstrated by adjusting the length of the resonant cavity (rather than by wavelength sweeping). The device was rendered tunable by using a piezoelectric stretcher to alter the effective cavity length (ie. change L2 and/or L4) over a range of a few micrometers. The reflected light ($E_4$) was extracted using a second (conventional) coupler located between the laser source and the device.

FIG. 4 shows the variation in reflected signal ($E_4$) as the device was tuned over approximately 1 micron. Two resonances are evident. FIG. 5 is a diagram of a corresponding variation in transmitted signal ($E_3$). As the measurements of FIGS. 4 and 5 were made at different times they are not precisely matched, however the operation of the device is nonetheless clearly demonstrated. The measured finesse is above 50, compared with the theoretical maximum reflection finesse of 102 in this example. The free spectral range is estimated to be 45 MHz. (The free spectral range is the reciprocal of the round-trip travel time for light in the cavity, and is therefore inversely proportional to the cavity length. The finesse is calculated as the ratio of the free spectral range to the full width at half maximum (FWHM).)

As noted above, and as apparent, for example, from FIGS. 2 and 3, the finesse is greater, and the frequency selectivity finer, as the degree of coupling indicated by the coupling parameter, K, is increased. However, as is also apparent from FIGS. 2 and 3, increases in finesse are eventually at the expense of decreases in modulation depth. This variation is illustrated directly in FIG. 6, where modulation depth is plotted against finesse for different values of coupling loss, $\gamma$, and for the specific device configuration and parameters as detailed on the Figure.

For practical purposes, therefore, it may not generally be desirable automatically to choose K to be as high as possible over the spectral range of interest. Consequently, in selecting an appropriate K for the coupling, the skilled person will have regard to the relative merits of frequency selectivity and modulation depth in the particular circumstances prevailing. Normally, however, K will be expected to be at least 0.75 at wavelengths across the relevant spectral range. Generally, the lower the achievable coupling loss ($\gamma$), the higher will be the preferred value of the coupling parameter, K. Practically, K will commonly be at least 0.85, and where a very low coupling loss is obtainable, for example, K may feasibly be at least 0.95 across the relevant spectral range.

Figure 7:
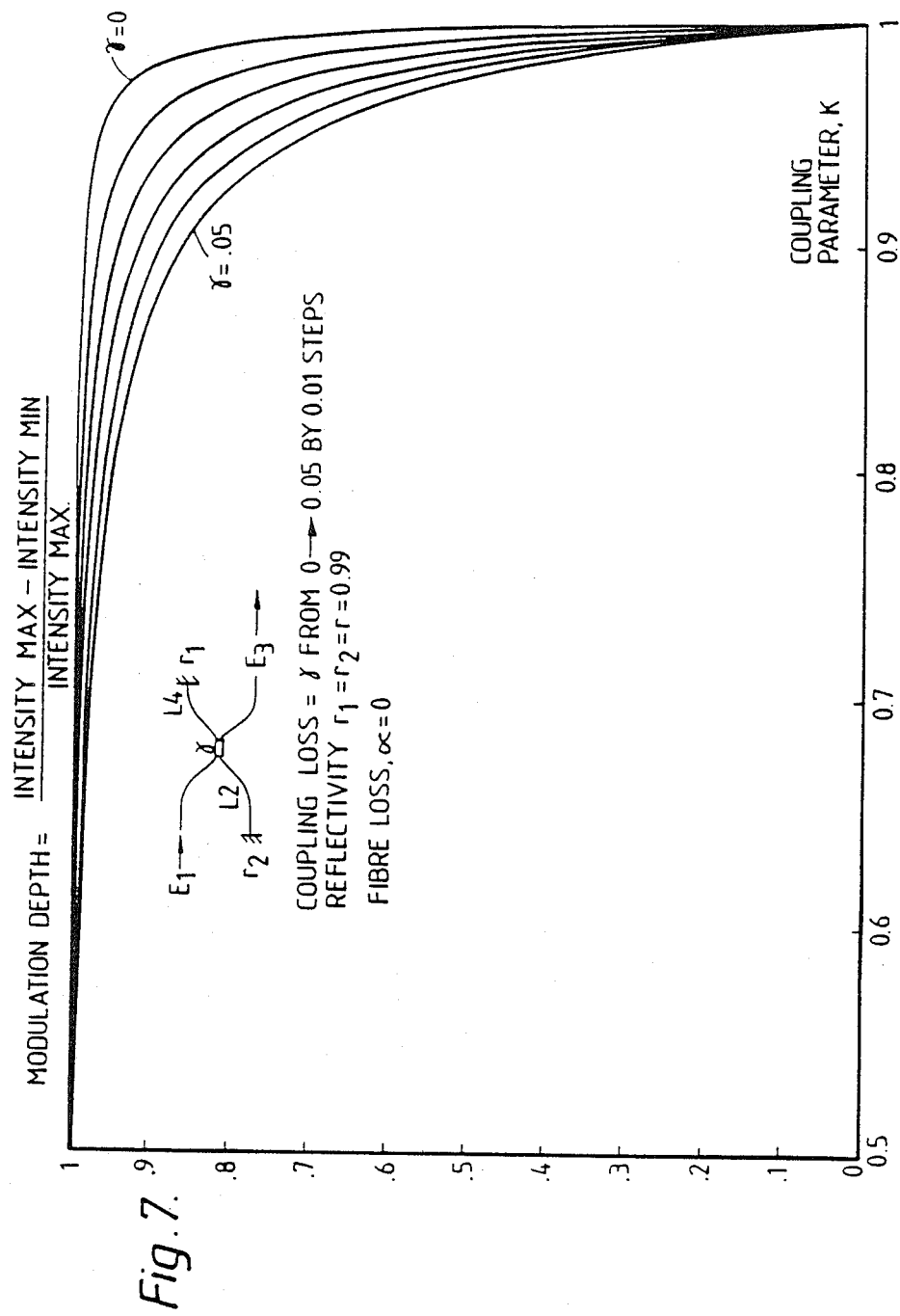
FIG. 7 is a calculated graph of the modulation depth versus coupling parameter, K, for a device of FIG. 1, for the indicated input and output configuration.

The extent of the variation of modulation depth relative to changes in the coupling parameter, K, is plotted graphically in FIG. 7. The modulation depth is calculated for an input ($E_1$) and transmitted output ($E_3$) for various values of coupling loss ($\gamma$), with fixed reflectivities and zero intrinsic fibre transmission loss ($\alpha$), as shown.

Although the specific embodiments illustrated use optical fibres, it should be appreciated that a transverse coupled device according to the present invention could also be constructed from other suitable dielectric optical waveguides, for example, lithium niobate structures. Such alternative structures may be particularly appropriate, for example, for the construction of cavities of sub-millimetric length.

It may also be convenient to make the resonant cavity active to provide resonant enhancement. This may be achieved, for example, by doping one or both of the fibres, in the region forming the resonant cavity, with a light amplifying medium. Neodymium is one suitable medium of this type. Such devices may be important in the realisation of all-fibre lasers, for example.

Alternatively, it is possible to induce Stimulated Raman Scattering (SRS) or Stimulated Brillouin Scattering (SBS) in the resonant cavity to achieve a multipass operation with wavelength shifting. By injecting light at a power above the SRS or SBS threshold, for the cavity at the injected wavelength, SRS or SBS may be induced, promoting a shift to a longer wavelength (Stokes emission).

Resonant devices according to the present invention provide convenient filters in optical transmission systems. A resonant cavity formed according to FIG. 1 may be easily spliced (at ends 4,7) into a transmission line, for example, to modify the transmission characteristics as may be appropriate. It will be appreciated that bending losses can be avoided and that no gap is required or introduced in the transmission line in such constructions.

The present invention also facilitates the construction of further novel resonant devices. For example, two or more devices according to the present invention with differing or appropriately matched behaviour, for instance, may be connected in-line. In other novel embodiment(s), for example, additional reflection means may be provided on either or both other ends (4,7) of the waveguides (ie. the ends shown without reflection means in FIG. 1) to further modify the device responses. Such devices may have particular application for narrowing the output linewidth of all-fibre lasers.

I claim:

1. A dielectric optical waveguide device (1) comprising a first waveguide (2) transversely coupled to a second waveguide (3) at a coupling region (6), wherein the first and second waveguides (2, 3) have substantially identical propagation constants at all wavelengths, and one end (5, 8) of each waveguide (2, 3) selected at opposite respective ends of said coupling region (6) is provided with a reflection means, thereby to form a Fabry-Perot cavity.

2. A device according to claim 1 wherein said waveguides (2,3) are monomode optical fibres.

3. A device according to claim 1 wherein said waveguides (2,3) are formed in a planar substrate.

4. A device according to claim 1 wherein the reflection means comprises a high reflectivity surface comprising a metallic coating.

5. A device according to claim 1 wherein the reflection means comprises a high reflectivity surface comprising a dielectric coating.

6. A device according to claim 1 or claim 2, wherein the waveguids (2, 3) within the Fabry-Perot cavity are doped with a dopant, in addition or alternative to any conventional refractive index modifying dopant.

7. A device according to claim 6 wherein said dopant is a light amplifying medium.

8. A device according to claim 1 or claim 2 including tuning means to alter the length (L2+L4) of the Fabry-Perot cavity, thereby to tune the device.

9. A device according to claim 8 wherein the tuning means comprises a piezo-electric stretcher.

10. A dielectric optical waveguide device (1) comprising a first waveguide (2) transversely coupled to a second waveguide (3) at a coupling region (6), wherein one end (5, 8) of each waveguide (2, 3) selected at opposite respective ends of said coupling region (6) is provided with a reflection means, thereby to form a Fabry-Perot cavity, wherein the coupling parameter, K, is at least 0.75 across the operating spectral range of the device.

11. A method of wavelength selection of optical signals using a dielectric optical waveguide device (1) comprising a first waveguide (2) transversely coupled to a second waveguide (3) at a coupling region (6), wherein the first and second waveguide (2, 3) have substantially identical propagation constants at all wavelengths, and one end (5, 8) of each waveguide (2, 3) selected at opposite respective ends of said coupling region (6) is provided with a reflection means, thereby to form a Fabry-Perot cavity, said method of wavelength selection comprising the step of: inputting optical signals (E1, E2) into a or each waveguide (2, 3), whereby selected optical signals (E3, E4) are output from the device from output ports (4, 7).

12. A method according to claim 11 comprising the step of: inputting the optical signals (E1, E2) at a power above the SBS/SRS threshold for the Fabry-Perot cavity at the wavelength of the signals, thereby to obtain an optical output (E3, E4) at a different wavelength.

13. A method of manufacturing a dielectric optical waveguide device (1) including a first waveguide (2) transversely coupled to a second waveguide (3) at a coupling region (6), wherein the first and second waveguides (2, 3) have substantially identical propagation constants at all wavelengths, and one end (5, 8) of each waveguide (2, 3) selected at opposite respective ends of said coupling region (6) is provided with a reflection means, thereby to form a Fabry-Perot cavity, said method comprising the steps of: providing reflective surfaces on one end of each of two dielectric optical waveguides; and coupling the two waveguides at a coupling region such that ends of the two waveguides having reflective surfaces are at opposite respective ends of the coupling region.

* * * * *